United States Patent [19]

Hayashi et al.

[11] 4,307,859
[45] Dec. 29, 1981

[54] AUTOMATIC MESSAGE ANNOUNCEMENT SYSTEM

[75] Inventors: Yoshiro Hayashi; Akira Sugihara; Takaki Shimura, all of Tokyo; Kozo Ishikawa, Yokohama; Kiyoshi Wada; Eiji Yamanaka, both of Tokyo; Shunsuke Senba, Yokohama, all of Japan

[73] Assignees: Japanese National Railways; Fujitsu Limited; Fujitsu Kiden Ltd., all of Japan

[21] Appl. No.: 121,045

[22] Filed: Feb. 13, 1980

Related U.S. Application Data

[63] Continuation of Ser. No. 883,169, Mar. 3, 1978, abandoned.

[51] Int. Cl.³ .................. B61L 25/02; G08G 1/01; G08G 1/12
[52] U.S. Cl. .................. 246/124; 246/2 R; 246/107; 340/23; 340/38 R; 360/12; 364/424
[58] Field of Search .................. 340/23, 38 R, 38 L, 340/24; 246/5, 124, 107, 162, 222, 3, 14, 2 R, 108; 364/460, 424, 436; 360/12

[56] References Cited

U.S. PATENT DOCUMENTS

| | | | |
|---|---|---|---|
| 1,870,294 | 8/1932 | Prescott | 246/124 |
| 2,571,973 | 10/1951 | Walker | 246/124 |
| 3,582,949 | 6/1971 | Forst | 360/12 |
| 3,601,602 | 8/1971 | Smith | 246/124 |
| 3,737,911 | 6/1973 | Sakaragi | 343/6.5 SS |
| 3,889,291 | 6/1975 | Walker | 360/12 |
| 3,976,272 | 8/1976 | Murray et al. | 246/5 |
| 4,135,143 | 1/1979 | Argentieri | 360/12 |
| 4,159,490 | 6/1979 | Wood | 360/12 |
| 4,190,819 | 2/1980 | Burgyan | 340/23 |

FOREIGN PATENT DOCUMENTS 50-82903 7/1975 Japan.
51-108962 3/1978 Japan.

OTHER PUBLICATIONS

*Nikkel Electronics*, Aug. 14, 1972, pp. 64–78.
IBM, "OS/VS2TSO Guide to Writing a Terminal Monitor Program or a Command Processor", 1972–1976.
Electronic Communication Associate, "Electronic Communication System For Shinkansen", Feb. 15, 1974.
*Hitachi Review*, vol. 24, No. 4, Apr. 1975, pp. 181–187.

*Primary Examiner*—James J. Groody
*Attorney, Agent, or Firm*—Staas & Halsey

[57] ABSTRACT

An automatic message announcement system for trains in the railroad station premises, including a train tracking circuit which tracks the location of approaching train, a trains information memory which stores information concerning each train, an edition circuit which combines the train information read out from said train information memory and a series of message patterns which include portions to be completed and which edits the message patterns to produce a series of short messages arranged sequentially according of their priority order to the content, an announcement message selection circuit which determines up to which short message among those arranged sequentially according to said priority order should be announced, in accordance with the location of the train at the time the announcement starts, and an automatic announcement system which includes a voice memory containing addressable voice segments for annoucing the message determined above.

10 Claims, 5 Drawing Figures

AUTOMATIC MESSAGE ANNOUNCEMENT SYSTEM

This is a continuation of application Ser. No. 883,169, filed Mar. 3, 1978 now abandoned.

BACKGROUND OF THE INVENTION

This invention relates to an automatic message announcement system which automatically announces the necessary information about trains arriving at a railroad station, and more particularly to an automatic message announcement system suitable for modifying a standard message announcing that a train is approaching the platform of the station.

Usually, when a train approaches to or arrives at the station, an announcement about the approach or arrival of the train is performed at the station premises. Such announcements are usually performed by the person in charge. However, recently such announcements have been carried out automatically to save labor.

In an existing automatic message announcement system, a passing train detecting point is located on the route of the train, and of the train passing signal which it emits is logically AND-ed with the "home" or "route" signal (platform entrance signal), which means that the route for going to the platform is clear. This logical AND signal operates a recording machine, for example, a tape recorder or voice magnetic disk type announcement system, on which the message for announcing the approach of the train has previously been recorded. This automatic announcement system accommodates announcement of relatively long messages by providing the passing train detecting point at a location relatively far from the station. But during rush-hour when train traffic is very heavy, or when the departure of a train at the platform is delayed and the next train passes the passing train detecting point before the train at the platform has started, the timing of the message announcing the approaching train will be delayed. Moreover, the announcement may be delayed until after the train has arrived. If the length of the announcement is shortened in order to eliminate this disadvantage the resulting message may not be sufficient.

In addition, the above-mentioned automatic message announcement system has the disadvantage that only one message of fixed length is available at a time.

BRIEF SUMMARY OF INVENTION

This invention is a novel one, improving the disadvantages of the abovementioned existing automatic message announcement system, and an object of this invention is to provide a system which can complete messages for announcing the approach of a train without fail until the approaching train arrives at the platform, and moreover this invention is capable of executing various kinds of announcements in accordance with the closeness of the train, that is, in accordance with the distance between the train and the platform.

Another object of this invention is to provide a system in which train information is at first combined with a series of message patterns with the combined result being divided into a plurality of short message blocks and arranged sequentially in a memory according to the priority order of the content of the message. The position of the approaching train when the message starts determines how many of the message blocks are used, thereby determining the length of the message actually announced.

Another object of this invention is to provide a message announcement system wherein a voice memory which stores various voice segments is provided, and announcement is carried out by selecting specified voice segments in accordance with the message to be announced.

Other features and advantages of the invention will be apparent from the following description taken in connection with the accompanying drawings.

DESCRIPTION OF THE PREFERRED EMBODIMENT

Figure 1:
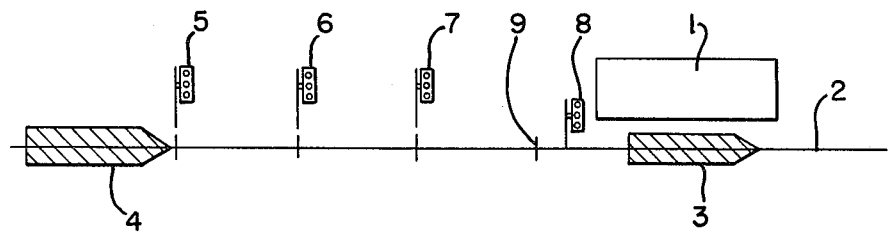
FIG. 1 is a block diagram of the railroad line.

FIG. 1 is a block diagram illustrating a railroad line. In this figure, numeral 1 represents the platform; 2 represents the railroad; 3 represents a train stopped at the platform; and 4 represents a train approaching the platform. On the railroad 2, wayside signals which control train operation are installed. In this figure, numerals 5 to 8 represent wayside signals.

Numeral 5 represents the first wayside signal; 6 represents a second signal; 7 represents a third signal; and 8 represents a fourth signal. In this invention, operation signals generated during operation of all these wayside signals 5, 6, 7 and 8 are used. In other words, a signal which becomes "high" when the train 4 passes the first wayside signal 5 and it changes to red is considered as the train passing signal A, a signal which becomes "high" when the train 4 passes the second wayside signal 6 and it changes to red is considered as the train passing signal B, while a signal which becomes "high" when the train passes the third wayside signal 7 and it changes to red is considered as the train passing signal C. In addition, a signal which becomes "high" when the train 3 has left the platform, so that the route for entering the platform is established and the fourth wayside signal 8 changes to green, is considered as the route signal H.

Moreover, in this invention, a passing train detecting point 9 is provided which is a little short to the fourth wayside signal 8 and the signal issued from said point 9 is considered as the train passing signal D.

The priority order of the train passing signals is given as follows: train passing signal D>train passing signal C>train passing signal B>train passing signal A. Now, operation of this invention will be explained, in connection with the accompanying drawings FIG. 2 to FIG. 5.

Figure 2:
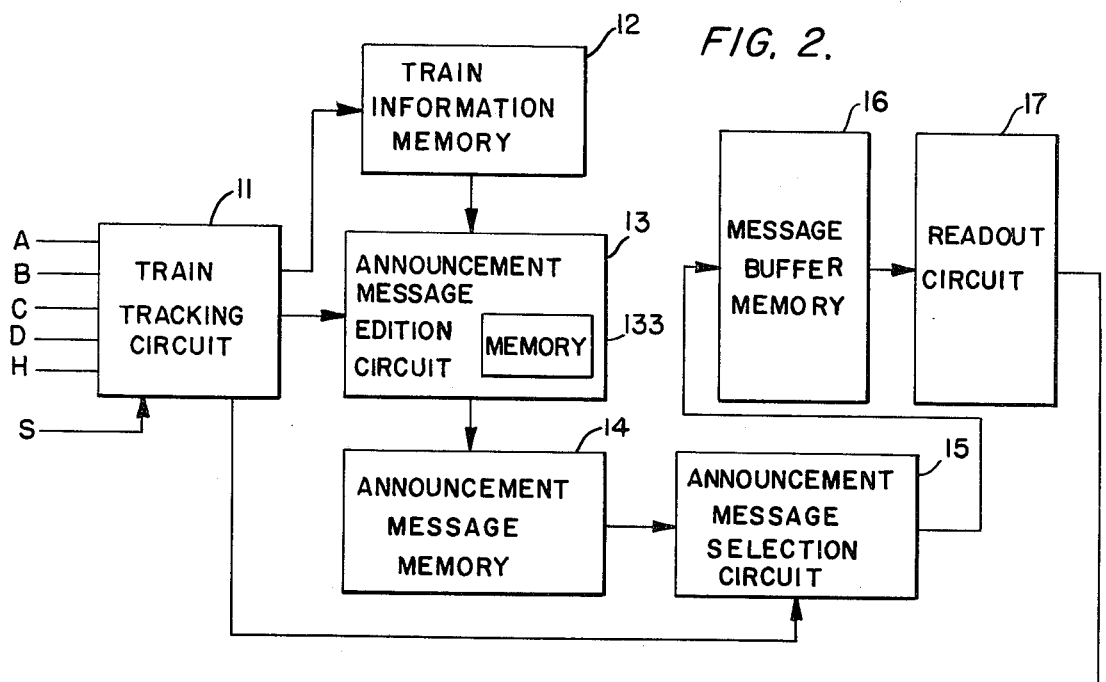
FIG. 2 is a block diagram of the automatic message announcement system related to this invention.
Figure 2:
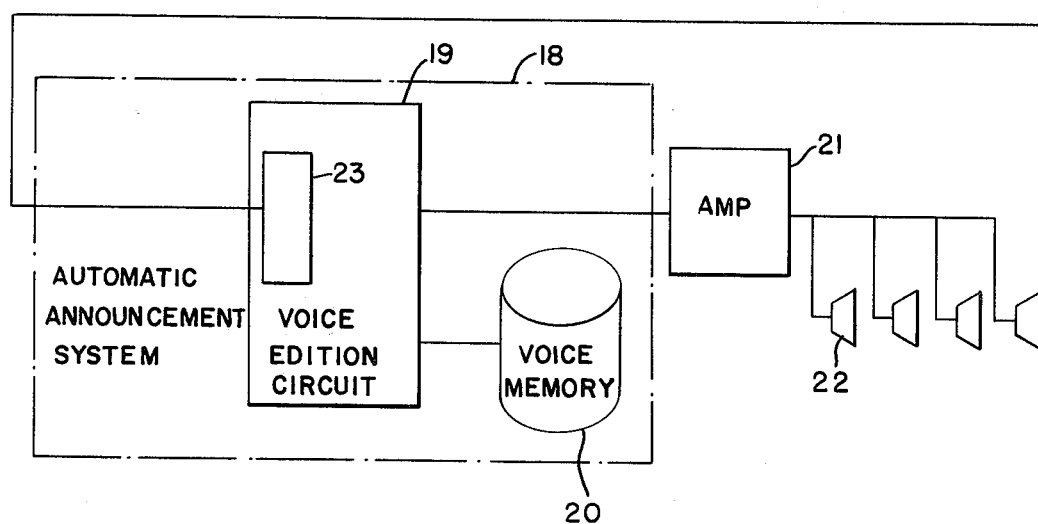

FIG. 2 is a block diagram of a preferred embodiment of this invention. In FIG. 2, numeral 11 represents a train tracking circuit which receives the train passing signals A, B, C, D, the route signal H, and a signal S sent from the train number read-out circuit, not illustrated, and which is capable of tracking the location of the train; 12, a train information memory which stores the name, destination, track number for arrival, and time of departure of each train; 13, an announcement message edition circuit which comprises a memory 133 for storing a series of messages patterns including a part to be completed in the form of a series of short sentences which are arranged sequentially in accordance with the priority order, and which edits the message for announcing the approach of the train by combining the train information read out from said train information memory 12 on the basis of a command from the train tracking circuit 11 and said message patterns; 14, an announcement message memory which stores a plurality of short message sentences edited at the abovementioned message edition circuit 13 in accordance with the given priority order; 15, an announcement message selection circuit which determines up to which message sentence arranged according to the priority order should be announced in accordance with the train location sent from train tracking circuit 11 and which selects the predetermined announcement message; 16, a message buffer memory which stores the messages for announcement selected by the message selection circuit; 17, a read-out circuit; 18, an automatic announcement system which is capable of executing the announcement for the train based on the memory content of the message buffer memory 16 and which comprises the voice memory 20 for storing various voice segments forming the message and the voice edition circuit 19 having the input buffer 23; 21, an amplifier; and 22, a loudspeaker.

Figure 3:
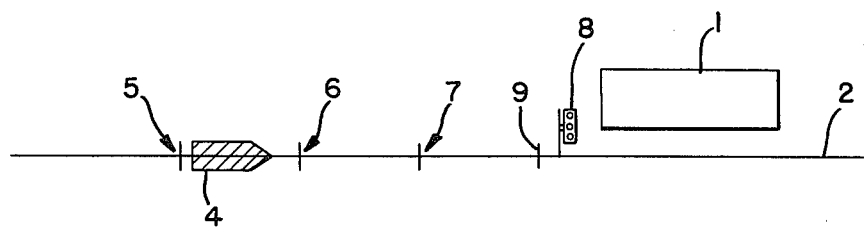
FIG. 3 to FIG. 5 are drawings for explaining the positional relationship between an approaching train, the preceding train, the signals and the platform.

As shown in FIG. 3, when no train is stopped at the platform 1 and an approaching train 4 passes the first wayside signal 5, said signal 5 issues the train passing signal A and the train tracking circuit 11 commands the train information memory 12 to transmit the data about the train to the announcement message edition circuit 13 on the basis of the signal S sent from the train number read out equipment, not illustrated in FIG. 2, and the message edition circuit 13 gets the data regarding to the train, for example, "Hikari No. 13 for Hakata" from those stored for the day in the memory 12. The data concerning the train are combined with the message patterns which are stored in memory 133 and which include a part to be completed as shown in Table 1, in the announcement message edition circuit 13, and then transferred to the announcement message memory 14, thus forming the short message blocks as shown in Table 2.

TABLE 1

| Short message block | Message pattern Message to be entered into the parenthesis are part to be changed |
|---|---|
| a | The ( ) which will start at ( ):( ) for ( ) is coming soon to the track No. ( ). |
| b | Coaches are named as No. 1 to No. 2 in succession from the leading one. The last coach is No. 16. |
| c | No. 11 and No. 12 coaches are for GREEN cars and No. 1 to No. 4 coaches are for unreserved seats. |
| d | The ( ) will stop sequentially at Shin-osaka, Okayama, Hiroshima and then Hakata, after leaving this station. |

TABLE 2

| Short message block | Message pattern |
|---|---|
| a | The Hikari No. 13 which will start at 17:53 for Hakata is coming soon to the track No. 1. |
| b | Coaches are named as No. 1 to No. 2 in succession from the leading one. The last coach is No. 16. |
| c | No. 11 and No. 12 coaches are for GREEN cars and No. 1 to No. 4 coaches are for unreserved seats. |
| d | The Hikari No. 13 will stop sequentially at Shin-osaka, Okayama, Hiroshima and then Hakata, after |

TABLE 2-continued

| Short message block | Message pattern |
|---|---|
| | leaving this station. |

As one of the features of this invention, a complete message for announcing the approach of a train is composed of a series of short messages, such as the following:

a: Short message for announcing the train approach information;

b: Short message for announcing the train arrangement c: Short message for announcement about coaches; and d: Short message for announcing subsequent stops Moreover, as another other feature of this invention, the priority of these short messages is designated as $a > b > c > d$.

When the home signal H becomes "high", an announcement start command is sent to the announcement message selection circuit 15 from the train tracking circuit 11. The message selection circuit 15 transfers the series of short messages, such as $a+b+c+d$ shown in Table 2, to the message buffer memory 16 from the announcement message memory 14.

The data transferred to the buffer memory 16 are read by the read-out circuit 17 and then sent to the automatic announcement system 18. These message data should be, for example, the voice segment address designation data for the voice memory 20. The voice segment address data for the voice memory 20 are sequentially stored into the input buffer 23 within the voice edition circuit 19, and thereafter a voice signal corresponding to the voice segment address sequence within the input buffer is amplified by the amplifier 21 and then announced from the loud-speakers 22.

The message content in an embodiment of the present invention is shown below.

"The Hikari No. 13 which will start at 17:53 for Hakata is coming soon on track No. 1.

Coaches are named as No. 1 to No. 2 in succession from the leading one. The last coach is No. 16.

No. 11 and No. 12 coaches are for GREEN cars and No. 1 to No. 4 coaches are for unreserved seats.

The Hikari No. 13 will stop sequentially at Shin-osaka, Okayama, Hiroshima and then Hakata, after leaving this station." This message for announcing the approach of the train is relatively long, but the train takes a considerable amount of time to arrive at the platform after passing the first signal 5.

Figure 4:
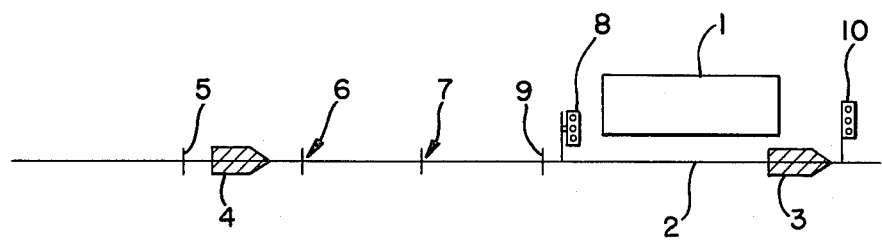

When an approaching train 4 passes the first wayside signal 5 (as shown in FIG. 4), while the preceding train 3 is stopped at the platform 1, and thereafter the train 4 runs between the first wayside signal 5 and the second wayside signal 6, while the train 3 starts and passes the starting signal 10 as shown in FIG. 4, the route signal H becomes high level. In this case, the message announcing the approach of the train 4 is carried out just as explained above.

Figure 5:
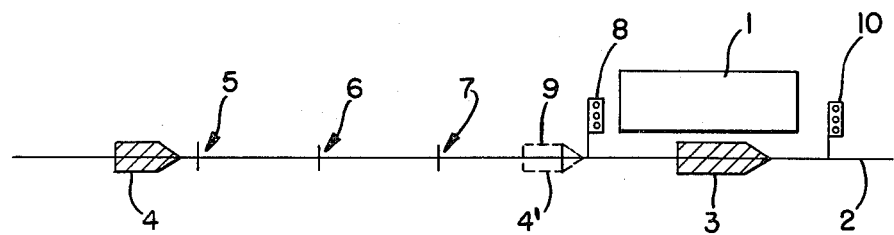

Explained below is the case shown in FIG. 5, where an approaching train 4 passes sequentially the first wayside signal 5, the second wayside signal 6, the third wayside signal 7, and the passing train detecting point 9 when the preceding train 3 is stopped at the platform 1, and then the train 4 stops at the position 4' since the fourth wayside signal 8 changes to red, and thereafter the preceding train 3 leaves the station.

As explained above, when the train 4 is stopping at the position 4', if the preceding train 3 is stopping at the platform 1, the message for train 4 is not announced since the route signal H is not issued. When the train 3 then leaves the station and passes the starting signal 10, making the route signal, "high," the announcement start command is sent to the announcement message selection circuit 15 from the train tracking circuit 11. The message selection circuit 15 selects the short message block a in the highest priority order and then transfers it to the message buffer memory 16. The data are sent to the automatic announcement system 18 via the read-out circuit 17. Thus, the following message is announced.

"The Hikari No. 13 which will start at 17:53 for Hakata is coming soon on track No. 1".

In this case, since the message is relatively short, the approach announcement for train 4 will be completed when the train arrives at the platform 1 (track No. 1). As explained in detail previously, this invention determines the location of the train when a message announcement begins, combines the complete short message blocks forming a series of messages in accordance with the detected location, and thereby completes the announcement for the train before it arrives at the platform. For this reason, there is no chance of announcing the approach of the train after it has arrived at the platform, which often occurs with the existing automatic announcement system, and thus this invention will never cause dismay among the railroad passengers. This invention, moreover, has other excellent features and effects, such as enabling the announcement of various messages by effectively making use of the period before the train arrives for starting the announcement for the train. Table 3 shows the relationship between the messages obtained by combining of short messages which are controlled by the message selection circuit 15 and the location of an approaching train.

TABLE 3

| Train location at the time announcement starts | Combination of short messages |
| --- | --- |
| Location between the first wayside signal 5 and the second wayside signal 6 | a + b + c + d |
| Location between the second wayside signal 6 and the third wayside signal 7 | a + b + c |
| Location between the third wayside signal 7 and the passing train detecting point 9 | a + b |
| Passing train detecting point 9 | a |

In the above embodiment, the passing train detecting points are located at four points, however, the invention is not limited only to four points. The number of such points can be reduced or increased as required. Moreover, a total of four kinds of complete short messages, which form a message series, are used for simplification, but the invention is not limited to four kinds. Furthermore some of the train passing signals are obtained from the wayside signals, but other adequate devices can also be used. The embodiment of this invention mainly describes the announcement for the approach of a train, but it is certain that this invention can be adopted also to calling the guidance of vehicles at a motor pool, etc., in addition to announcing train arrivals, train departures, etc., at a railroad station for the convenience of passengers.

What we claim is:

1. An automatic message announcement system for announcing the approach of a scheduled train upon tracks leading to a platform, comprising: train tracking means for receiving both a plurality of train passing signals when said train has passed corresponding predetermined points along said track and a route signal indicating the periods when the route for incoming trains is clear to said platform, and for generating therefrom a signal indicating the distance between the approaching train and the platform at a period when the route for incoming trains is clear; train information memory means for storing train information about the approaching train; message edition circuit means, including memory means for storing a series of predetermined message patterns including a part to be completed with train information, for combining the train information read out from said train information memory means with said series of message patterns and editing the combination into a plurality of short sentences arranged sequentially in accordance with a predetermined priority order; and selection circuit means responsive to said signal indicating the distance between said approaching train and said platform at a period when the route for incoming trains is clear for selecting said short sentences for announcement in accordance with said priority order.

2. An automatic message announcement system according to the claim 1, further comprising: voice memory means for storing voice segments forming messages to be announced; and voice edition control circuit means for receiving said short sentences for announcement and addressing corresponding voice segments stored in said voice memory means.

3. An automatic message announcement system for announcing the approach of scheduled vehicles advancing along a predetermined route to a vehicle boarding area, the messages announced being composed of at least one short sentence selected from a sequence of short sentences, comprising:

addressable voice memory means for storing prerecorded voice segments forming said short sentences;

announcement message edition circuit means for storing and reading out voice segment address data corresponding to said sequence of short sentences a plurality of vehicle passing signal means for generating vehicle passing signals when a vehicle passes predetermined points at different distances along said route to said vehicle boarding area;

route signal means for generating a route signal during the period when no vehicles are located at said vehicle boarding area; and first means responsive to said plurality of vehicle passing signal means and said route signal means for addressing said voice memory means with voice segment address data read out from said announcement message edition circuit means when no vehicles are located at said vehicle boarding area and an advancing vehicle has past at least the most distant of said predetermined points, said first means selecting said short sentences for announcement by truncating said sequence at a point determined by the distance between said vehicle and the boarding area at the time said route signal appears if said distance is too short to allow announcement of all of the short sentences in the sequence.

4. The automatic announcement system of claim 3, further comprising vehicle information memory means for storing data corresponding to vehicle information about scheduled vehicles, and wherein said announcement message edition circuit means further comprises means for combining voice segment address data stored therein with data corresponding to vehicle information read out of said vehicle informtion memory means to produce sequences of data corresponding to short sentences having vehicle information about scheduled vehicles.

5. The automatic announcement system of claim 4, wherein said first means comprises announcement message memory means connected to said announcement message edition circuit means for storing the data combined by said announcement message edition circuit means, buffer memory means for storing data corresponding to short sentences selected for announcement, and announcement message selection circuit means connected between said announcement message memory means and said message buffer memory means for selecting the short sentences for announcement by transferring the corresponding data from said announcement message memory means to said message buffer memory means.

6. The automatic announcement system of claim 5, wherein said scheduled vehicles are trains, said route is a track, and said vehicle boarding area is a platform.

7. The automatic announcement system of claim 6, wherein there are four vehicle passing signal means, at least one comprising a wayside signal positioned beside the track.

8. A method for automatically announcing a message as an approaching vehicle draws near a stopping point in a transportation terminal, comprising the steps of:

storing voice segments corresponding to a sequence of short sentences in an addressable voice memory;

storing data for addressing the voice memory in an announcement message edition circuit;

sensing the distance between the approaching vehicle and the stopping point at a time when no vehicles are positioned at said stopping point;

composing a message corresponding to at least the first short sentence in the sequence of short sentences by selecting data read out from the announcement message edition circuit, the number of data selected depending upon the distance sensed at said time when no vehicles are positioned at said stopping point;

addressing the voice memory with the selected data; and amplifying and transducing the output of the voice memory.

9. The method of claim 8, further comprising the steps of storing data corresponding to information about the approaching vehicle in a vehicle information memory and combining said data with the data stored in the announcement message edition circuit before composing the message, thereby including information about the approaching vehicle in the message announced.

10. The method of claim 9, wherein the step of sensing the distance between the approaching vehicle and the stopping point at a time when no vehicles are positioned at said stopping point comprises using signals derived from a plurality of wayside signals beside railroad tracks leading to a platform and using a sensor to detect when a vehicle is absent from the platform, the step of composing a message being conducted when a vehicle is absent from said platform.

* * * * *

UNITED STATES PATENT AND TRADEMARK OFFICE
CERTIFICATE OF CORRECTION

PATENT NO. : 4,307,859

DATED : December 29, 1981

INVENTOR(S) : Hayashi et al.

It is certified that error appears in the above—identified patent and that said Letters Patent is hereby corrected as shown below:

Front page, [56] References cited, other publications, line 1, "Nikkel" should be --Nikkei--;

Front page, [57] Abstract, line 4, "train, a trains" should be --trains, a train--.

line 10, "of their" should be --to the--;

line 11, "to the" should be --of their--.

Col. 1, line 16, "approaches to" should be --is approaching--;

line 24, after "and" delete "of";

line 45, after "tage" insert --,--; after "be" delete ",".

Col. 2, line 32, delete "operation".

UNITED STATES PATENT AND TRADEMARK OFFICE
CERTIFICATE OF CORRECTION

PATENT NO. : 4,307,859

DATED : December 29, 1981

INVENTOR(S) : Hayashi et al.

It is certified that error appears in the above—identified patent and that said Letters Patent is hereby corrected as shown below:

Col. 4, line 15, after "ment" insert --,--;

line 18, after "stops" insert --.--;

Col. 5, line 8, after "signal" change "," to --H--;

line 56, after "points" change "," to --;--.

Col. 6, line 47, after "sentences" insert --;--.

Col. 7, line 8, "informtion" should be --information--.

Signed and Sealed this

Twenty-first Day of December 1982

[SEAL]

Attest:

GERALD J. MOSSINGHOFF

Attesting Officer

Commissioner of Patents and Trademarks